United States Patent [19]

Jardinier et al.

[11] 4,336,904
[45] Jun. 29, 1982

[54] DELIVERY STABILIZER FOR VENTILATION SHAFT

[75] Inventors: Pierre Jardinier, Gournay sur Marne; Jack Simonnot, Lesigny, both of France

[73] Assignee: Societe d'Etudes et de Recherches de Ventilation et d'Aeraulique S.E.R.V.A., Gournay sur Marne, France

[21] Appl. No.: 192,028

[22] Filed: Sep. 29, 1980

[30] Foreign Application Priority Data

Oct. 5, 1979 [FR] France ............................. 79 24829

[51] Int. Cl.³ ........................................... G05D 27/00
[52] U.S. Cl. ................................. 236/92 R; 236/93 R; 236/101 A; 236/101 D; 138/46; 137/468; 137/500; 137/504; 137/843
[58] Field of Search ............. 137/468, 500, 504, 843, 137/853; 251/61.1; 236/49 X, 92 R, 93 R, 101 R, 101 D, 103; 138/46

[56] References Cited

U.S. PATENT DOCUMENTS

| | | | |
|---|---|---|---|
| 3,353,560 | 11/1967 | McCulloch | 137/853 X |
| 3,384,113 | 5/1968 | Pennisi | 137/853 |
| 3,432,139 | 3/1969 | Jentott | 251/61.1 |
| 3,958,605 | 5/1976 | Nishizu | 137/504 X |

FOREIGN PATENT DOCUMENTS 1139339 11/1962 Fed. Rep. of Germany ..... 251/61.1
7012065 12/1971 France.

*Primary Examiner*—Harold W. Weakley
*Attorney, Agent, or Firm*—Browdy and Neimark

[57] ABSTRACT

A bladder, suitably formed of silicone rubber and molded into a cylindrical shape, is provided internally with a deforming spring. The resultant unit serves as a delivery stabilizer for a ventilation shaft without loss of elasticity of the bladder.

10 Claims, 10 Drawing Figures

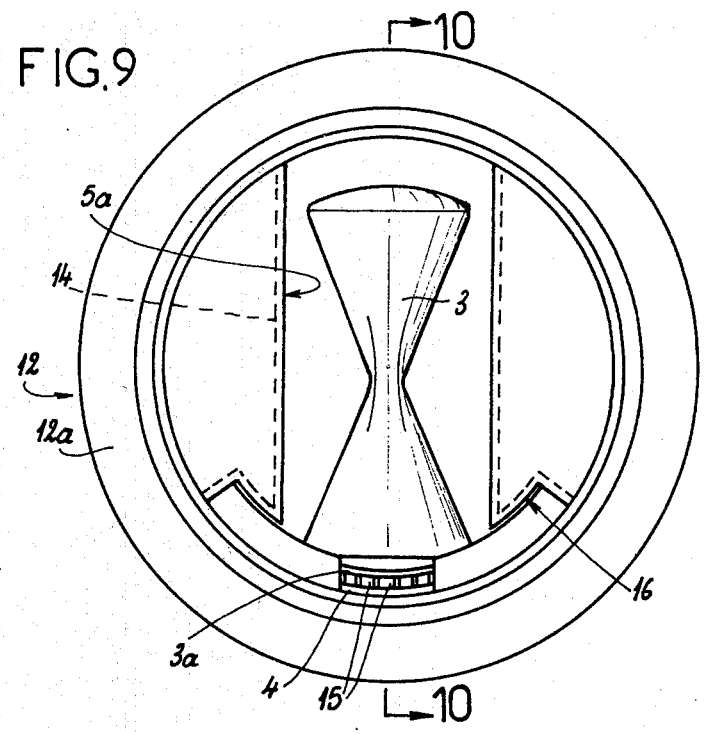
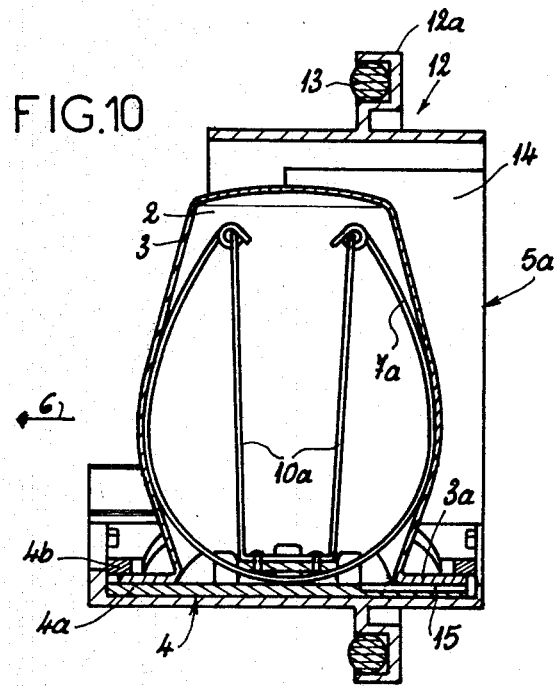

DELIVERY STABILIZER FOR VENTILATION SHAFT

FIELD OF INVENTION

This invention relates to a delivery stabilizer for a ventilation conduit.

BACKGROUND OF INVENTION

From U.S. Pat. No. 3,718,160 there is known a stabilizer comprising a chamber consisting of a deformable bladder, a seat supporting such chamber with an orifice allowing the air to pass into or out of the chamber and means making it possible to fit this seat to the ventilation shaft so that the orifice is directed upstream, the respective dimensions of the chamber and section of the shaft being such that under the action of pressure differences upstream and downstream, the variations in volume of the chamber that result therefrom modify the air passage section in the space between the chamber and shaft. In comparison with those previously known, this stabilizer has the advantage of stabilizing the air delivery without amplifying sudden fluctuations and consequently without maintaining oscillations in the shaft.

According to an embodiment of this stabilizer, described in U.S. Pat. No. 3,718,160, the chamber consisting of a bladder is made of a moldable or injectable flexible and elastic material such as rubber or the like. Naturally the bladder is molded in such a shape that, at rest, it occupies minimal volume, its own elasticity assuring its return to this minimal volume as there is a decrease in the pressure difference between the zones located upstream and downstream in the shaft from the stabilizer. This arrangement has the double drawback of being onerous and not durable because of the reduction of elasticity of the bladder material as it ages.

SUMMARY OF INVENTION

An object of the invention is to overcome deficiencies in the prior art and particularly to remedy the above-mentioned double drawback. For this purpose, in the stabilizer to which it relates and which is of the general type mentioned above, spring means are associated with the bladder constituting the chamber on the inside of which they are housed to assure its return to minimal volume when the pressure difference, between the zones of the ventilation shaft located upstream and downstream from it, drops below a predetermined threshold.

Thus, the bladder can be molded in the shape corresponding to its maximal volume, which, because of the absence of an undercut, facilitates its removal from the mold, and its return to its minimal volume is no longer dependent on its own elasticity. Consequently, its life is considerably extended.

According to a simple embodiment of the invention, the bladder has the shape of a cylinder of circular section and the spring means associated with it consists of a spring steel ring whose diameter is approximately equal to half the circumference of the bladder and which is fastened to the seat of the bladder by at least a point of its circumference. In case it is desired that stabilization of the delivery not be disturbed by temperature variations, heat structure means associated with the spring means is provided which compensates for the effects of temperature variations by reducing the volume of the chamber when the temperature increases and vice-versa. Preferably, to assure a good mechanical protection of the spring means during handling of the stabilizer, the spring means are housed between parallel plates forming a protective, and optionally, guide housing.

According to an improved embodiment of the invention, to compensate the variations in air volume as a function of temperature variations and to have the delivered amount of air remain constant if only the temperature varies, the spring means placed inside the chamber have the shape of at least an arc of a circle, such as an open ring and at least one of its ends is fastened to a heat-sensitive support placed in such a way that it moves this end in the direction corresponding to an increase of the radius of curvature of the ring, i.e., a reduction of the volume of the chamber, if the temperature increases, or vice-versa. This support can be made up, for example, of a bimetal strip.

Advantageously, each end of the open ring is fastened to a heat-sensitive support and such support is made of a bimetallic strip in the form of a U-shaped yoke whose central branch is fastened to the chamber seat.

According to another characteristic of the invention, the means for fitting the chamber seat to the ventilation shaft is made of a cylindrical sleeve whose outside diameter corresponds to the internal diameter of said shaft and whose outside wall carries a collar for fastening by clamping or the like and whose internal diameter exhibits a rectangular passage section corresponding to the dimensions of the bladder with a slide parallel to its generatrices and able to receive the bladder seat. Thus, when the stabilizer is dirty, it suffices to remove the sleeve fastened on the ventilation shaft and remove the bladder by sliding its seat along the slide which acts as a housing for it, its reassembly after cleaning obviously being done by the opposite steps.

According to a practical embodiment of the invention, the bladder has a collar surrounding its orifice and its seat consists of two rectangular or square plates assembled together detachably and bent to the profile of the inside diameter of the sleeve intended to receive it, the plate of greatest radius of bend or outside plate carrying, in its center, elements for fastening the spring means, while the other or inside plate exhibits a central opening whose perimeter corresponds to that of the cross section of the bladder whose collar is sandwiched between the two plates, the orifice for passage of the air into the chamber being formed by grooves made from the central zone of the inside face of the outside plate to its edge corresponding to the upstream zone of the ventilation shaft.

According to another advantageous embodiment of the invention, the bladder constituting the chamber is made of silicone elastomer whose friction factor in relation to the spring means housed on the inside is very slight and which further offers the advantage of resisting high temperatures.

BRIEF DESCRIPTION OF DRAWING

In any case, the invention will be better understood from the following description with reference to the accompanying diagrammatic drawing, representing by way of non-limiting example, several embodiments of the stabilizer:

FIG. 9 is an end view showing a variant embodiment of the stabilizer of FIGS. 7 and 8; and FIG. 10 is a view in section along line 10—10 of FIG. 9.

DETAILED DESCRIPTION OF EMBODIMENTS

Figure 1:
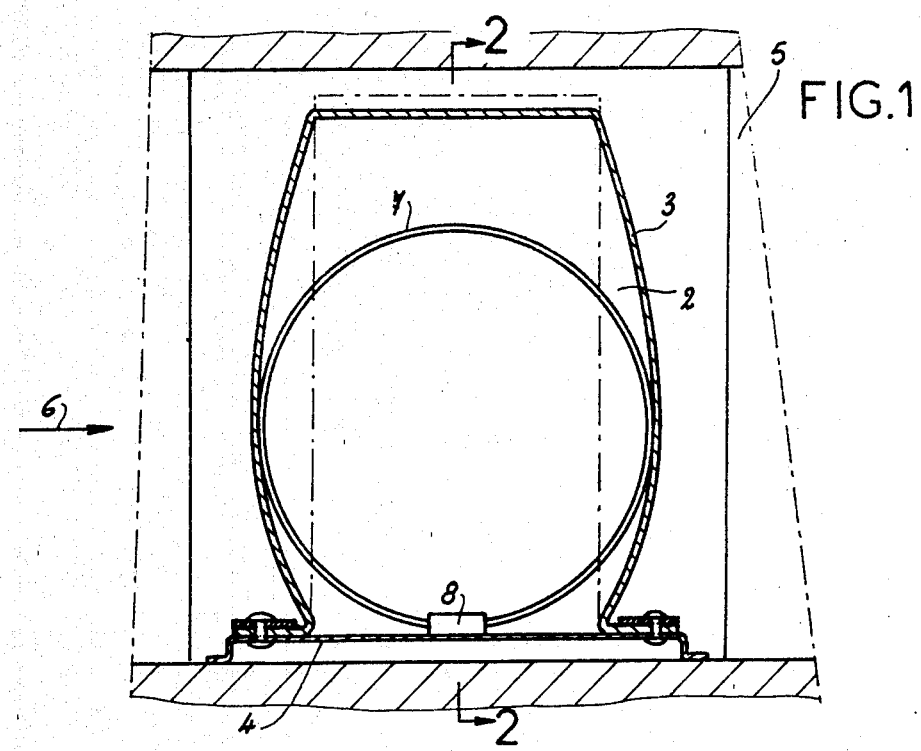
FIGS. 1 and 2 are views in section respectively along lines 1—1 of FIG. 2 and lines 2—2 of FIG. 1 showing the simplest embodiment of the stabilizer.

The stabilizer according to the invention is, as indicated above, of the general type described in U.S. Pat. 3,718,160, i.e. comprising a chamber 2 formed of a bladder 3 of deformable material, a seat 4 supporting the bladder 3, with a hole (not shown in FIGS. 1 to 8) allowing the air to enter and leave chamber 2. In addition, means (not shown in FIGS. 1 to 8) are provided to fasten the seat 4 to the interior of a ventilation shaft or duct 5, the delivery of air through which is to be regulated.

At the site of the bladder 3, the ventilation shaft 5 exhibits a rectangular air passage section 5a, which can be seen particularly in FIGS. 2, 4, 6 and 9. This rectangular section 5a is suited to the shape of chamber 2 of the bladder 3.

As indicated in the above-referenced patent, the orifice enabling the chamber 2 to communicate with the outside is directed toward the upstream zone of the shaft 5, i.e. the left side in FIGS. 1, 3, 5, 7 and 8, the direction of the air flow in this shaft 5 being shown by arrows 6. In FIG. 10, this orifice and consequently the corresponding arrow 6 are oriented in opposite directions.

Figure 2:
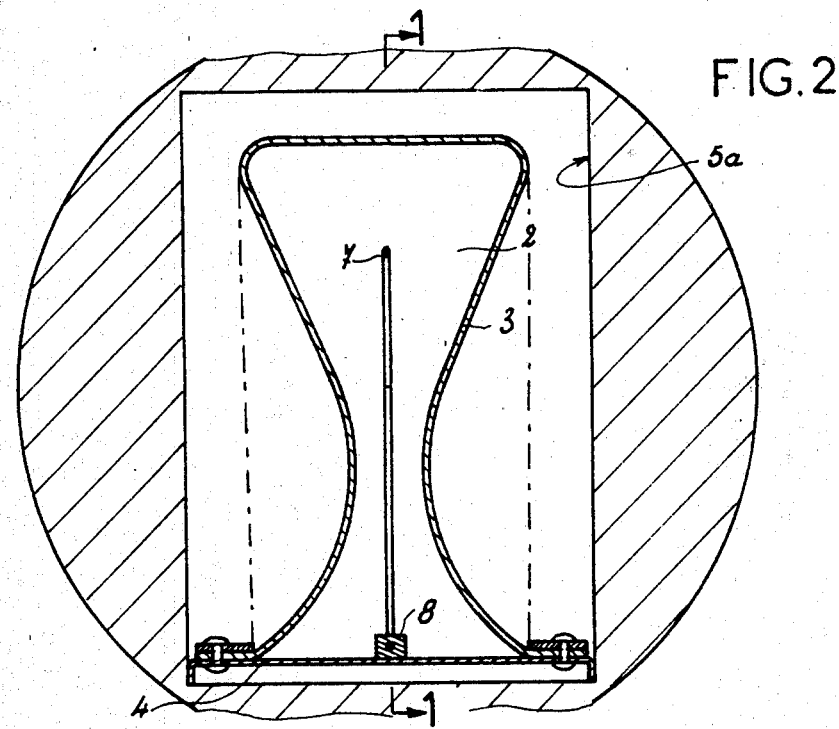

As already was the case of the device described in the aforementioned patent, in the absence of pressure differences between the upstream and downstream zones of the shaft 5, or when a very slight pressure difference prevails, the bladder 3 is at rest and the chamber 2 occupies a minimal volume as can be seen in FIG. 2, so as to exhibit a considerable air passage section at right angle to section 5a of shaft 5.

However, when the pressure difference exceeds a certain threshold, the bladder 3 inflates and, consequently, an increase in the volume of chamber 2 occurs, which results in a reduction of the air passage section between bladder 3 and the walls of section 5a of the shaft 5.

According to the present invention, the return of bladder 3 to its rest position, in which it occupies a minimal volume, is effected not by the elastic memory of the wall of the bladder 3, but by spring means mounted on the inside of the chamber 2. The presence of such spring means eliminates the drawbacks of aging of the constituent material of the bladder 3 because the functioning of this stabilizer no longer depends on the elasticity of this material. Further, the arrangement of the spring means on the inside of chamber 2 where the air is not flowing protects the spring means from dust and other corrosive agents.

Another advantage resulting from this arrangement resides in the fact that the bladder 3 can be molded in a simple shape and particularly in the cylindrical shape shown in phantom in FIG. 1, which facilitates its removal from the mold. This considerably reduces the cost of bladder 3.

This bladder 3 can, for example, be made of an elastomer and preferably of a silicone elastomer which exhibits not only the advantage of a very great flexibility, but also a very slight friction factor in relation to the spring means housed in the chamber. This material further has the advantage of resisting high temperatures well.

In the example shown in FIGS. 1 and 2, the spring means, housed on the inside of chamber 2 to keep bladder 3 in the position corresponding to the minimum volume of chamber 2, consists simply of a ring 7 of spring steel, fastened along one of the points of its circumference and by any suitable means 8 to the seat 4 of the stabilizer. This ring 7 has a diameter approximately equal to half of the circumference of the bladder 3, so that when the bladder 3 is not subjected to any differential pressure, it occupies the flattened position seen in FIG. 2 by virtue of the distorting action of the ring 7.

It is easily understood that when the pressure difference between the upstream and downstream zone of the duct 5 exceeds a certain threshold, there results a penetration of air into the chamber 2 tending to inflate the bladder 3 and consequently increase the volume of chamber 2 against the action of the spring ring 7; this, in turn, has the effect, by reducing the air passage section between the bladder 3 and the walls of section 5a of the duct 5, of braking or reducing the air delivery and consequently of obtaining the desired stabilization.

FIGS. 3 to 6 illustrate a variant embodiment of this stabilizer, wherein the spring means housed on the inside of the chamber 2 is made to take into account temperature variations. Actually when the temperature increases for a constant differential pressure, the delivered amount of air diminishes since the air volume increases. It is therefore desirable that the air passage section between the bladder 3 and the walls of section 5a of the shaft 5 be increased if it is desired that mass air delivery remain constant.

In the example shown in FIGS. 3 to 6, this result is obtained by the fact that the spring means consists of an open ring 7a of spring steel each end of which is connected to the free end of a bimetal strip 10; the two bimetal strips 10 are connected, by their other ends, to a brace 9 supported by two plates 11 fastened perpendicular to the seat 4 of the stabilizer. These plates 11 also act as a protective housing for the open ring 7a and bimetal strips 10 during handling of the stabilizer. These plates 11 also act to guide movement of the open ring 7a.

Figure 3:
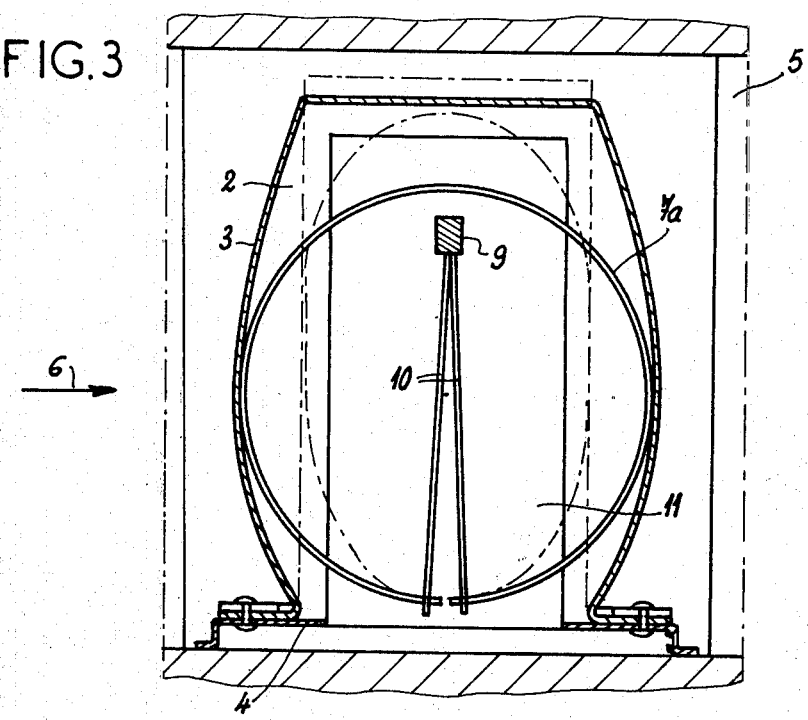
FIGS. 3 and 4 are views similar to FIGS. 1 and 2, illustrating another embodiment of this stabilizer, according to which temperature variations are taken into account.
Figure 4:
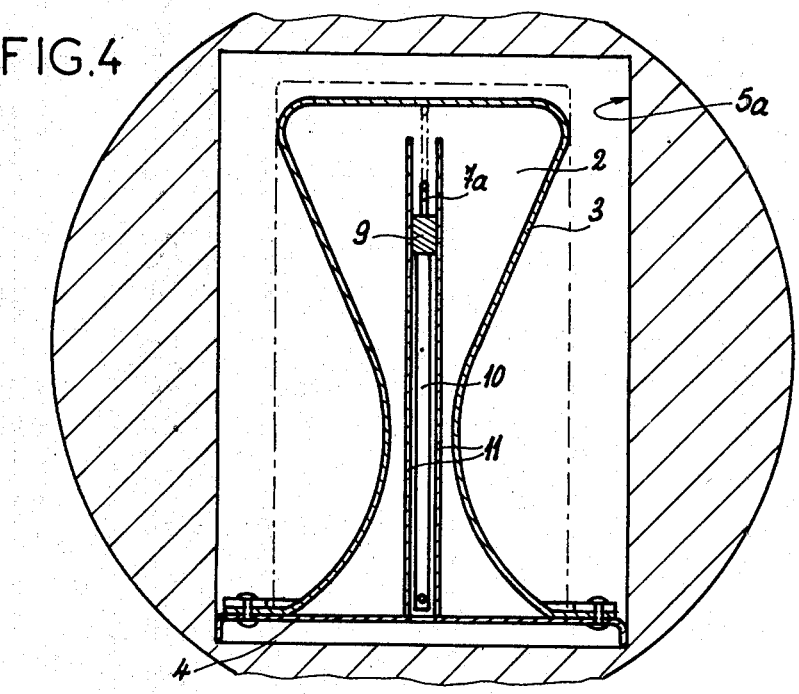
Figure 5:
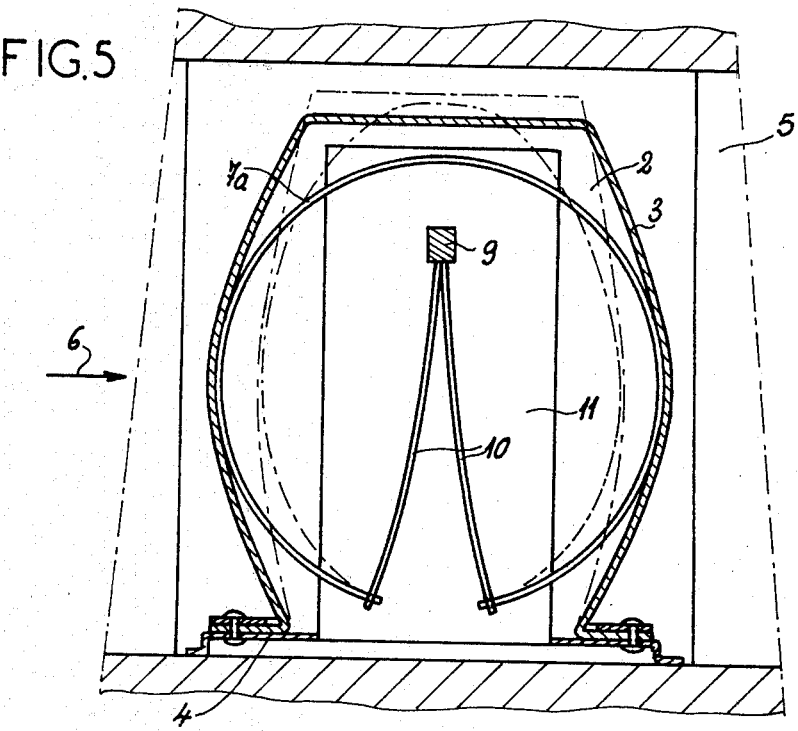
FIGS. 5 and 6 are views similar to FIGS. 3 and 4 showing the functioning of the stabilizer shown in FIGS. 3 and 4.

FIGS. 3 and 4 illustrate the position of bimetal strips 10 when the temperature is below a predetermined threshold, for example, 20° C. In this position, the two ends of the ring 7a rest against or closely adjacent one another and the stabilizer functions as in the example illustrated in FIGS. 1 and 2. When the temperature rises above the selected threshold, the two bimetal strips 10 start to separate, as shown in FIG. 5, thereby driving apart the ends of the ring 7a. For a determined differential pressure, the stresses exerted on bladder 3 increase with temperature. The air passage section between the bladder 3 and section 5a of the shaft 5 therefore increases and, consequently, the amount of air delivered, the volume of which has increased, remains constant. The "mass delivery" is therefore constant.

Figure 6:
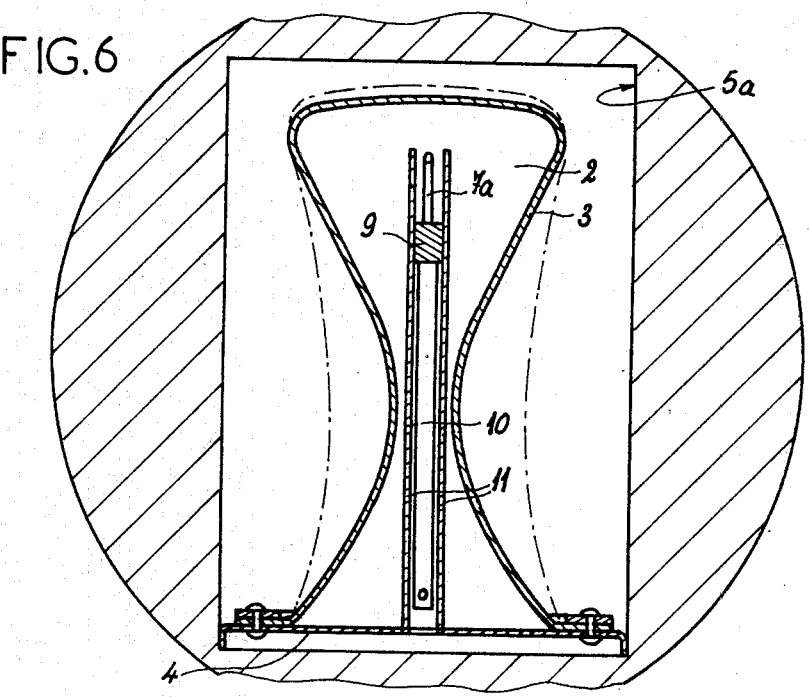

FIGS. 5 and 6 show, in solid lines, the position occupied by bladder 3 when the temperature is above the preselected threshold and the differential pressure is zero. In these same figures is represented, in phantom, the position occupied by ring 7a and bladder 3 when there is a differential pressure and the temperature is at a value above the preselected threshold.

Figure 7:
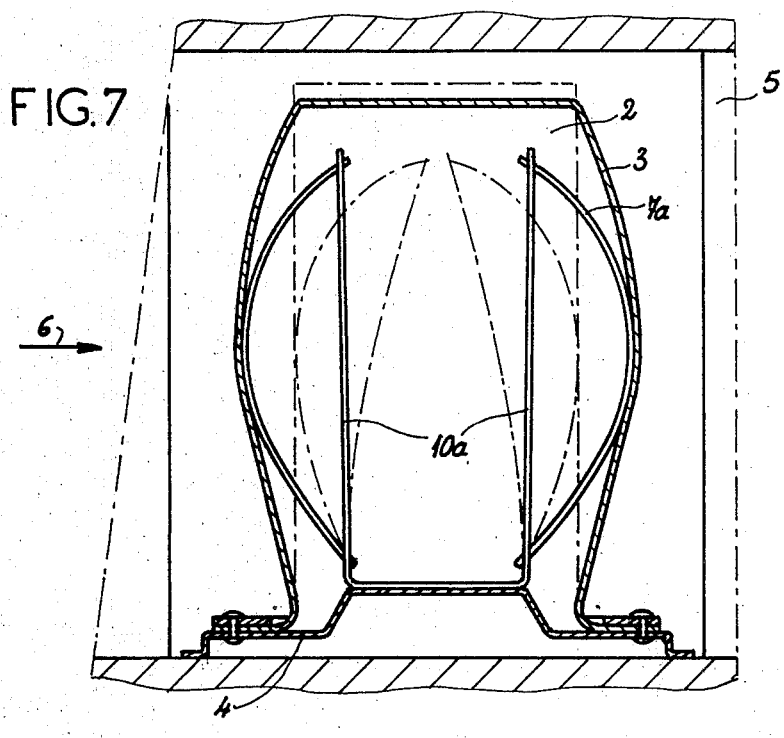
FIGS. 7 and 8 are views similar to FIG. 3 showing a variant embodiment of the stabilizer.
Figure 8:
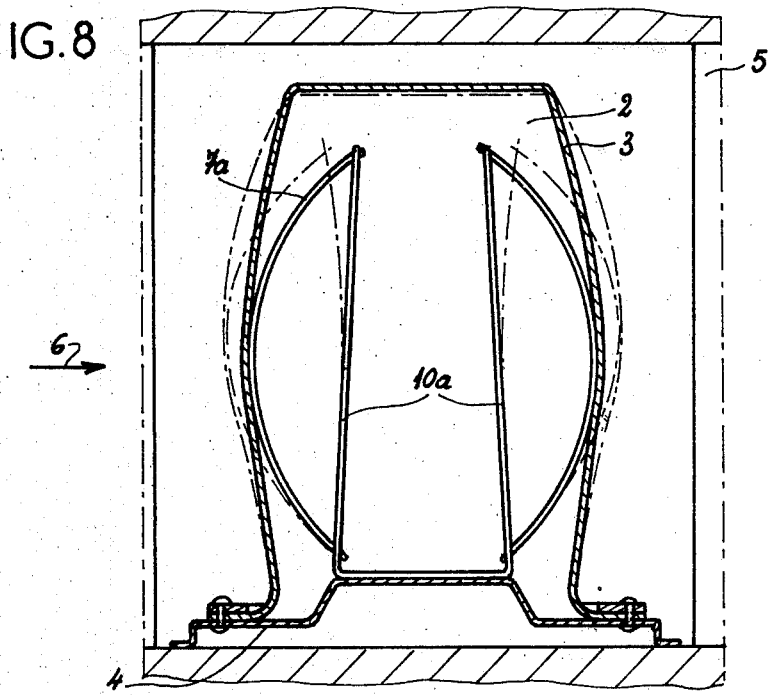

FIGS. 7 and 8 illustrate a variant embodiment of the stabilizer illustrated in FIGS. 3 to 6. In this variant, bimetal strips 10a, to each of which is connected one of the ends of an open ring 7a, form the side branches of a U-shaped yoke which is fastened by its central branch to the seat 4 of the stabilizer.

FIG. 7 shows respectively in solid and phantom lines, the extreme positions of the bladder 3, the ring 7a and the bimetal strips 10a at a constant temperature below the predetermined threshold, such positions resulting from the absence or the existence of a differential pressure.

FIG. 8 shows, in phantom and solid lines, the end position of the bladder 3, the open ring 7a, and the bimetal strips 10a corresponding respectively, for a predetermined differential pressure, to a temperature below the predetermined threshold and to a temperature greater than the predetermined threshold.

FIGS. 9 and 10 illustrate in detail an embodiment of FIGS. 7 and 8. In this embodiment, the means making possible the fitting of the seat 4 of the chamber to the ventilation shaft 5 consists of a cylindrical sleeve 12, the outside diameter of which corresponds to the inside diameter of the shaft 5 and the outside wall of which carries a collar 12a optionally provided with a fluid-tight joint 13 making possible its attachment by clamping or the like between two elements coaxial with the shaft 5. As FIG. 9 particularly shows, this sleeve 12 exhibits an inside partition 14 delimiting the approximately rectangular section 5a of the conduit 5 on the inside of which the bladder 3 is to be placed.

In the example shown in these FIGS. 9 and 10, seat 4 of bladder 3 consists of two rectangular or square plates 4a and 4b, assembled to one another detachably, for example, by clipping with hooks solid with one of the plates and able to engage in slots provided in the other plate, these plates being bent to the shape of the inside diameter of the sleeve 12. The outside plate 4a, i.e. the one exhibiting the greatest radius of curvature, exhibits on its inside face at least one groove 15 extending from its edge turned toward the upstream zone of the shaft 5 to the vicinity of its center, while the inside plate 4b, i.e. the one exhibiting the smallest radius of curvature, comprises, in its center, a circular opening having the diameter of the bladder 3.

As FIG. 10 particularly shows, the bladder 3 has a collar 3a surrounding its orifice and which is intended to be sandwiched between the two plates 4a and 4b of the seat 4, which assures the fluid-tight closing of chamber 2, the groove 15 constituting the orifice that enables the inside of chamber 2 to communicate with the outside.

Finally, as FIGS. 9 and 10 show, the partition 14 of the sleeve 12 is made with an uncoupling means 16 constituting a slide in shape of a cylinder sector, able to receive, by sliding the seat 4 of the chamber 2. This arrangement facilitates placement and removal of the seat 4 and, consequently, of bladder 3 and the spring means that are associated with it, particularly for cleaning it.

It is to be understood and is clear from the above description that the invention is not limited only to the embodiments that have been described above; on the contrary, it takes in all various embodiments. Thus, for example, in the embodiment illustrated in FIGS. 9 and 10, the sleeve 12 is made by molding of light alloy or plastic, but it could be made in any other suitable way, and particularly by metal welding.

What is claimed is:

1. In a ventilation shaft delivery stabilizer comprising a one-piece deformable bladder defining an interior chamber, a seat supporting said bladder comprising a single orifice allowing air to enter or leave said chamber, and means to fit said seat to the ventilation shaft so that the orifice is directed upstream and so that a space exists between the bladder and the shaft, the resepctive dimensions of the chamber and the section of the shaft being such that under the action of the pressure differences existing upstream and downstream, the variations of volume of the chamber resulting therefrom modify the air passage section in the space between the bladder and shaft, and spring means housed within said bladder to deform said bladder and to assure its return to its minimal volume when the pressure difference between the ventilation shaft zones located upstream and downstream from it, drops below a predetermined threshold.

2. Stabilizer according to claim 1 wherein said spring means comprises heat-sensitive means to compensate for temperature variations by reducing the volume of the chamber when the temperature increases.

3. Stabilizer according to claim 1 or claim 2 and a pair of parallel plates mounted on said seat, means to house said spring means between said parallel plates, whereby said parallel plates form a protective, supporting and guiding housing for said spring means.

4. Stabilizer according to claim 1 wherein said bladder is formed to the shape of a cylinder of circular section and said spring means consist of a spring steel ring whose diameter is approximately equal to half of the circumference of the chamber and which is fastened to said seat by at least a point on its circumference.

5. Stabilizer according to any of claims 1, 2 or 4 wherein said spring means has the shape of at least an arc of a circle, such as an open ring and at least one of its ends is fastened to a heat-sensitive support placed so that it moves this end in the direction corresponding to an increase of the radius of curvature of the ring, to a reduction of the volume of the chamber, if the temperature increases.

6. Stabilizer according to claim 5 wherein said support of the end of the open ring consists of a bimetal strip.

7. Stabilizer according to claim 5 wherein each end of the open ring is fastened to a heat-sensitive support which consists of a yoke-shaped bimetal strip whose central branch is fastened to said seat.

8. Stabilizer according to claim 1 wherein the means for fitting the chamber seat to the ventilation shaft consists of a cylindrical sleeve having an outside diameter corresponding to the inside diameter of said shaft, and said sleeve comprises an outside wall carrying a collar for fastening the inside diameter of said sleeve having a rectangular passage section corresponding to the dimensions of the bladder with a slide parallel to its generatrices and able to receive the bladder seat.

9. Stabilizer according to claim 8 wherein said bladder has a collar surrounding its orifice and its seat consists of two rectangular square plates detachably assembled to one another and bent to the profile of the inside diameter of the sleeve intended to receive it, the plate with the largest radius of bend being the outside plate and carrying, in its center, the means for fastening the spring means, while the other plate is formed with a central opening whose perimeter corresponds to that of the cross section of the bladder whose collar is sandwiched between the two plates, said orifice for passage of the air into the chamber being formed by grooves made from the central zone of the inside face of the outside plate to its edge corresponding to the upstream zone of the ventilation shaft.

10. Stabilizer according to claim 1 wherein the bladder defining said chamber is made from a silicone elastomer.

* * * * *